United States Patent [19]

Watanabe

[11] Patent Number: 5,410,554
[45] Date of Patent: Apr. 25, 1995

[54] OPTICAL DISK APPARATUS

[75] Inventor: Hiroshi Watanabe, Kawasaki, Japan

[73] Assignee: Kabushiki Kaisha Toshiba, Kawasaki, Japan

[21] Appl. No.: 33,352

[22] Filed: Mar. 18, 1993

[30] Foreign Application Priority Data

Mar. 23, 1992 [JP] Japan .................. 4-064985

[51] Int. Cl.$^6$ .................. G06F 7/00; G06F 7/02; H03M 13/00
[52] U.S. Cl. .................. 371/40.1; 371/37.1; 364/246; 364/246.2
[58] Field of Search .................. 371/40.1, 37.1; 364/246.2, 246.1, 248.1, 265, 265.1, 952.1, 959.4

[56] References Cited

U.S. PATENT DOCUMENTS

| | | | |
|---|---|---|---|
| 4,802,152 | 1/1989 | Markvoort et al. | 371/38 |
| 4,821,254 | 4/1989 | Sator et al. | 369/54 |
| 4,949,342 | 8/1990 | Shimbo et al. | 371/40.1 |
| 4,998,252 | 3/1991 | Suzuki et al. | 371/37.5 |
| 5,216,677 | 6/1993 | Takagi et al. | 371/40.3 |

*Primary Examiner*—Robert W. Beausoliel, Jr.
*Assistant Examiner*—Trinh Tu
*Attorney, Agent, or Firm*—Cushman Darby & Cushman

[57] ABSTRACT

An optical disk apparatus, in which the data supplied from a host computer is recorded on an optical disk by storing the data into a data buffer memory via an interface, by outputting the data to a recording-reproducing section, and by accessing the data buffer memory in time-sharing fashion. The data is reproduced from the disk by performing, in time-sharing fashion, the inputting of the data from the recording-reproducing section into the data buffer memory and the outputting of the data to the host computer via the interface. Since only one data buffer memory is used, the apparatus need not have a large circuit board and and can be manufactured at low cost.

3 Claims, 6 Drawing Sheets

| INPUT SIGNAL | | | (HIGH - ACTIVE) | | OUTPUT SIGNAL | (LOW - ACTIVE) | |
|---|---|---|---|---|---|---|---|
| CY-END | CY-CLK | S/p-REQ | ECC-REQ or CPU-CS | I/F-REQ | S/p-ACK | ECC-ACK or CPU-G | I/F-ACK |
| o | ← | o | o | o | - | - | - |
| o | ← | o | o | - | - | - | - |
| o | ← | o | - | o | - | - | o |
| o | ← | o | - | - | - | o | - |
| o | ← | - | o | o | - | o | - |
| o | ← | - | o | - | o | - | - |
| o | ← | - | - | o | o | - | - |
| o | ← | - | - | - | o | - | - |
| - | (leading edge) | * | * | * | - | - | - |

FIG. 3

OPTICAL DISK APPARATUS

BACKGROUND OF THE INVENTION

1. Field of the Invention

The present invention relates to an optical disk apparatus for recording data transferred from a host computer on an optical disk, reproducing the data from the optical disk, and transferring the data to the host computer.

2. Description of the Related Art

Optical disk apparatuses have data buffer memories for temporarily storing the data which has been transferred from a host computer and which is to be recorded on an optical disk, and for temporarily storing the data reproduced from the optical data. The conventional optical disk apparatuses have so-called "double buffer-memory structure," and comprise at least two data buffer memories. During a period of time, the first data buffer memories is used for transferring data between the apparatus and the host computer, whereas the second data buffer memory is used for transferring data between the apparatus and the optical disk. During the next period of time, the first buffer memories is used for transferring data between the apparatus and the optical disk, whereas the second data buffer memory is used for transferring data between the apparatus and the host computer.

A conventional optical disk apparatus needs to have two data buffer memories at the least. The data buffer memories are relatively large and expensive. Here arise two problems. First, the apparatus must have a circuit board large enough to hold the data buffer memories, along with the other electronic components. Second, the use of two or more data buffer memories would results in a high manufacturing cost of the apparatus.

At present it is increasingly demanded that an optical disk apparatus be made smaller and be manufactured at lower cost. In view of this it is not advisable to use many data buffer memories which are large and expensive components.

SUMMARY OF THE INVENTION

The object of the present invention to provide an optical disk apparatus which needs only one data buffer memory and which therefore needs but a relatively small circuit board and can therefore be made at a low cost.

In a first aspect of the invention, there is provided an optical disk apparatus having means for reproducing the data to an the external device, said apparatus comprising: a data buffer memory for storing data; input means for inputting the data reproduced by the reproducing means, into the data buffer memory; output means for outputting the data from the data buffer memory or to the external device; and control means for accessing, in time-sharing fashion, to the data buffer memory so as to control the input means and the output means.

In a second aspect of the invention, there is provided an optical disk apparatus having recording-reproducing means for recording data supplied from an external device on an optical disk, and for reproducing the data to the external device, said apparatus comprising: a data buffer memory for storing data; data-transferring means for receiving the data supplied from one of the external device and the data supplied from the data buffer memory means, and for supplying the data to one of the external device and the data buffer memory; input means for inputting the data supplied from the external device or the data reproduced by the recording-reproducing means, into the data buffer memory; output means for outputting the data from the data buffer memory to one of the recording-reproducing means and to the data-transferring means; and control means for accessing, in time-sharing fashion, to the data buffer memory so as to control the input means and the output means.

In a third aspect of the invention, there is provided an optical disk apparatus having recording-reproducing means for recording data supplied from an external device on an optical disk, and for reproducing the data to the external device, said apparatus comprising: a data buffer memory for storing data; data-transferring means for receiving the data supplied from one of the external device and the data supplied from the data buffer memory means, and for supplying the data to one of the external device and the data buffer memory; input means for inputting the data received by one of the data-transferring means and the data reproduced by the recording-reproducing means, into the data buffer memory; error-determining means for determining whether the data reproduced by the recording-reproducing means and being input into the data buffer memory by the input input means contains errors; error-correcting means for correcting errors found to be contained in the data by the error-determining means; output means for outputting the data from the data buffer memory to one of the recording-reproducing means and to the data-transferring means; and control means for accessing, in time-sharing fashion, to the data buffer memory so as to control the input means, the output means and the error-correcting means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

An embodiment of the invention will be described, with reference to the accompanying drawings.

Figure 1:
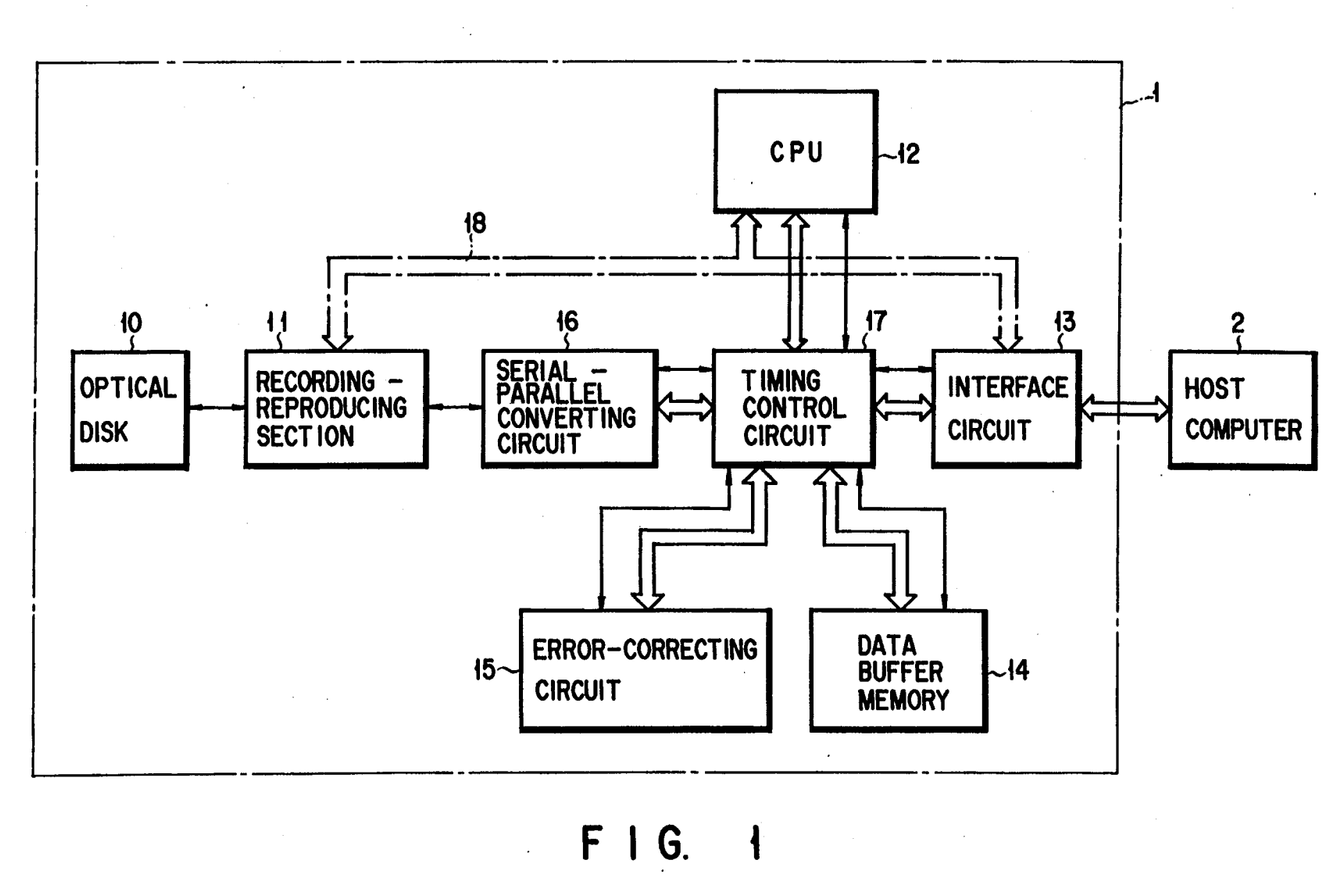
FIG. 1 is a block diagram showing an optical disk apparatus according to an embodiment of the invention.

FIG. 1 shows a data recording-reproducing system designed to record data on an optical disk 10 and reproduce the data from the disk 10. The system comprises an optical disk apparatus 1 and a host computer 2.

The optical disk apparatus 1 is an embodiment of the present invention. The apparatus 1 comprises a recording-reproducing section 11, a central processing unit (CPU) 12, an interface circuit 13, a data buffer memory 14, an error-correcting circuit 15, a serial-parallel converting circuit 16, a timing control circuit 17, and a system bus 18.

The recording-reproducing section 11 can record data on the optical disk 10 and reproduce the data from the disk 10. The CPU 10 is used to control any other component of the optical disk apparatus 1. The interface circuit 13 is provided for achieving data transfer between the apparatus 1 and the host computer 2. The data buffer memory 14 can store the data to be recorded on the disk 10, the data reproduced from the disk 10, and data corrected. The error-correcting circuit 15 is designed to determining whether or not the data reproduced from the disk 10 contains errors, from the check codes reproduced from the optical disk 10, and to correct any error found in the data. The serial-parallel converting circuit 16 can convert serial data produced from the disk 10, into 1-byte (8-bit) parallel data and the parallel data output by the timing control circuit 17, into serial data. The timing control circuit 17 is designed to output timing signals to the other components of the apparatus 1, thereby to control the operation timing thereof.

The system bus 18 connects the recording-reproducing circuit 11 and the interface circuit 13 to the CPU 12. Hence, the optical disk apparatus 1, a data-reproduction request supplied from the host computer 2 and the data representing the address of the disk 10 from which to reproduce data can be supplied to the CPU 12 through the interface circuit 13 and the system bus 18. Also, a data-recording request supplied from the host computer 2 and the data representing the address of the disk 10 at which to record data can be supplied to the CPU 12 through the interface circuit 13 and the system bus 18. To reproduce the data from the optical disk 10, the CPU 12 supplies the read address data, which has been output by the host computer 2, to the recording-reproducing section 11 through system bus 18. To record data on the disk 10, the CPU 12 supplies the write address data, which has been output by the host computer 2, to the recording-reproducing section 11 through system bus 18.

Figure 2:
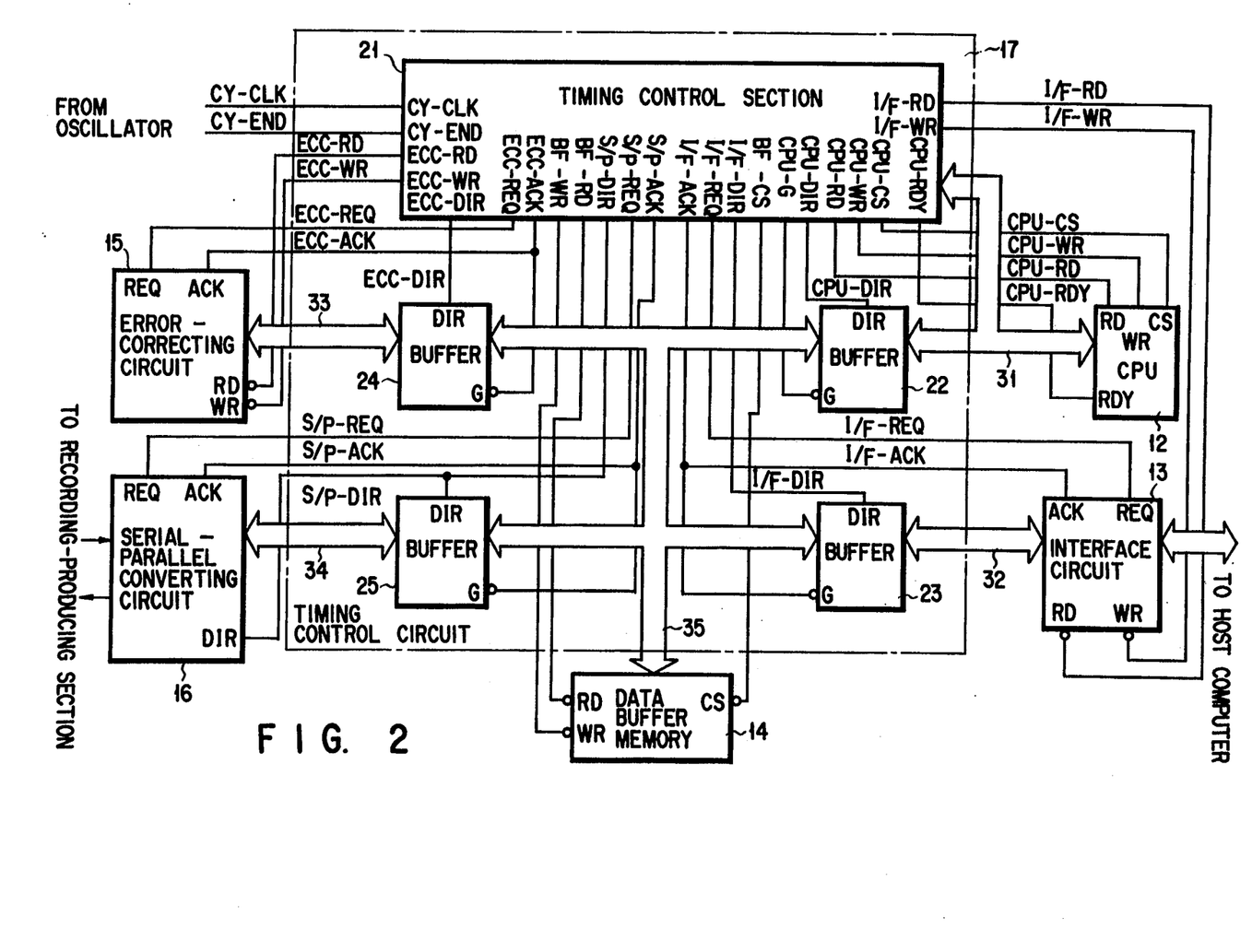
FIG. 2 is a block diagram showing the timing control circuit incorporated in the optical disk apparatus shown in FIG. 1.

As is shown in FIG. 2, the timing control circuit 17 comprises a timing control section 21, buffers 22 to 25, and data buses 31 to 35. The section 21 includes logic circuits such as AND circuits, OR circuits, and latch circuits. It is designed to output various timing signals as will be described later. The buffers 22 to 25 are used as gates for transferring data. The data bus 31 connects the section 21 and the buffer 22 to the CPU 12. The data bus 32 connects the buffer 23 to the interface circuit 13. The data bus 33 connects the buffer 24 to the error-correcting circuit 15. The data bus 34 connects the buffer 25 to the serial-parallel converting circuit 16. The data bus 35 connects the buffers 22 to 25 to one another, and also connect them to the data buffer memory 14.

Further, the buffers 22 to 25 are connected to the timing control section 21 by signal lines. Also, as is shown in FIG. 2, the components 12, 13, 14, 15 and 16 are connected to the timing control section 21 by various signal lines.

In operation, the timing control section 21 receives various signals. More specifically, it receives a cycle-clock signal CY-CLK and a cycle-end signal CY-END from an oscillator (not shown), a chip-select signal CPU-SC, a read signal CPU-RD and a write signal CPU-WR from the CPU 12, a data-transfer request signal I/F-REQ from the interface circuit 13, a data-transfer request signal ECC-REQ from the error-correcting circuit 15, and a data-transfer request signal S/P-REQ from the serial-parallel converting circuit 16.

The timing control section 21 outputs various signals. To be more precise, it outputs a ready signal CPU-RDY to the CPU 12, a read signal I/F-RD, a write signal I/F-WR and an acknowledge signal I/F-ACK to the interface circuit 13, a read signal BF-RD, a write signal BF-WR and a chip-select signal BF-CS to the data buffer memory 14, a read signal ECC-RD, a write signal ECC-WR and an acknowledge signal ECC-ACK to the error-correcting circuit 15, and an acknowledge signal S/P-ACK and a direction signal S/P-DIR to the serial-parallel converting circuit 16. Further, the timing control section 21 outputs a direction signal CPU-DIR to the buffer 22, a direction signal I/F-DIR to the buffer 23, a direction signal ECC-DIR to the buffer 24, and a direction signal S/P-DIR to the buffer 25. Also, the timing control section 21 outputs a gate signal CPU-G to the buffer 22, the acknowledge signal I/F-ACK used as a gate signal to the buffer 23, the acknowledge signal ECC-ACK used as a gate signal to the buffer 24, and the acknowledge signal S/P-ACK used as a gate signal to the buffer 25.

The timing control circuit 17 is controlled by four signals in order to transfer data. These signals are: the chip-select signal CPU-CS supplied from the CPU 12, the data-transfer request signal I/F-REQ supplied from the interface circuit 13, the data-transfer request signal ECC-REQ supplied from the error-correcting circuit 15, and the data-transfer request signal S/P-REQ supplied from the serial-parallel converting circuit 16. The data-transfer request signals have different priorities. More precisely, the signal S/P-REQ has the highest priority, the signals ECC-REQ and CPU-CS have the second highest priority, and the signal I/F-REQ has the lowest priority. That is: S/P-REQ>ECC-REQ (CPU-CS)>I/F-REQ.

The timing control circuit 17 enables a data-transfer request signal or the chip-select signal CPU-CS in accordance with the priority assigned to the signal—at a leading edge of the cycle clock signal CY-CLK while the the cycle-end signal CY-END remains at the "0" level, as is illustrated in FIG. 3 and FIGS. 4A to 4H. In other words, the timing control circuit 17 determines, at the end of each read/write cycle, which data-transfer request is to be enabled in the next read/write cycle, and then enables the data-transfer request thus determined, at the start of the next read/write cycle.

Figure 3:
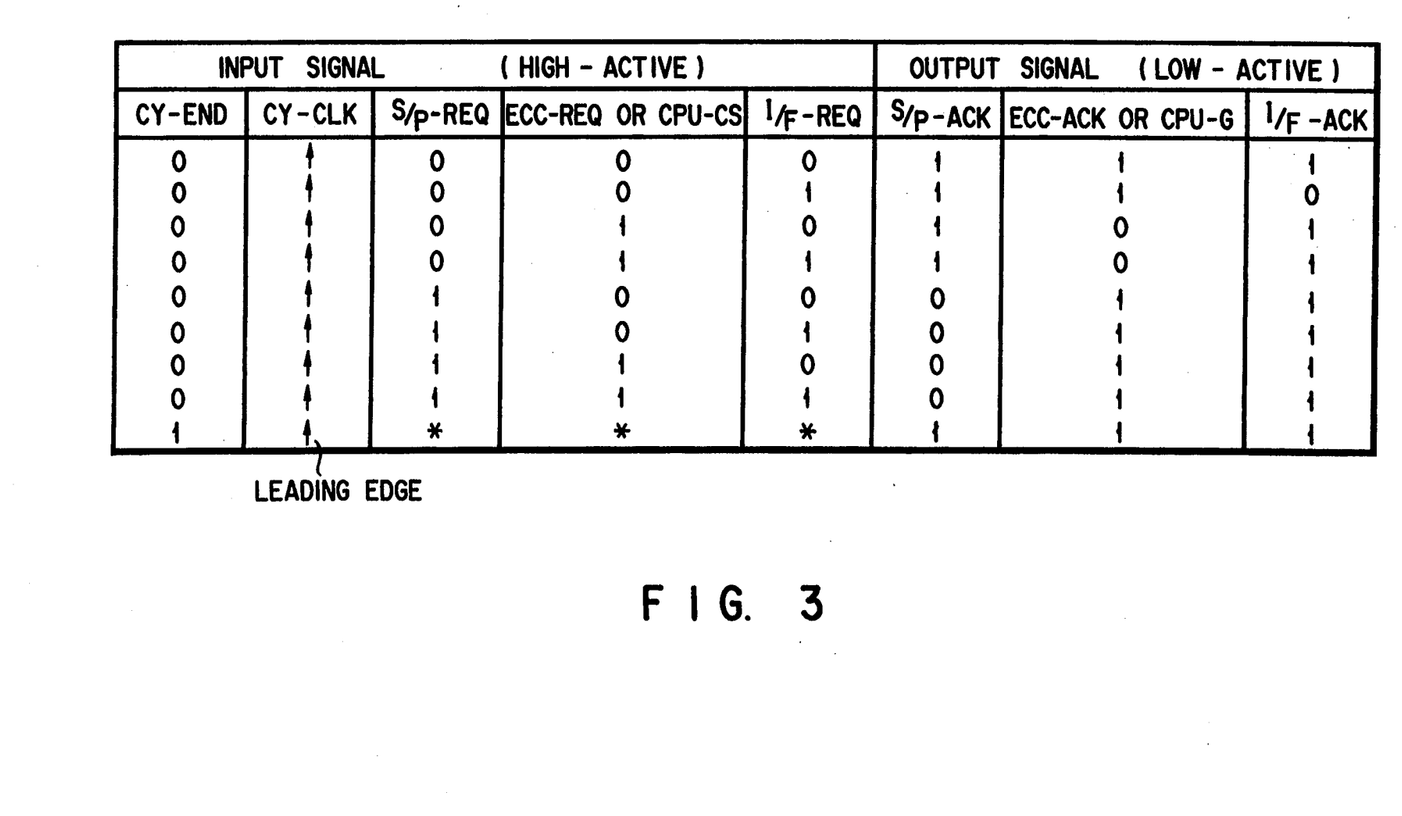
FIG. 3 is a table showing various logic values which the signals input to the timing control circuit may take, and also various logic values which the signals output from the timing control circuit may assume.
Figures 4A, 4B:
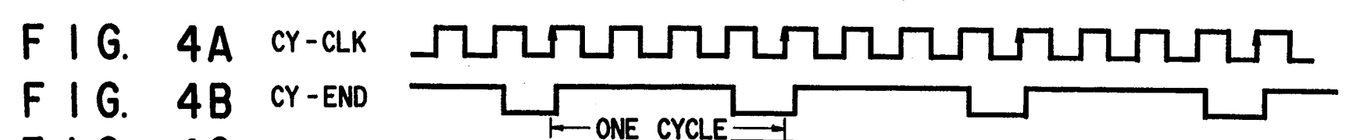
FIGS. 4A to 4H are a timing chart, explaining how the signals input to and output from the timing control circuit have their logic values changed.
Figure 4C:
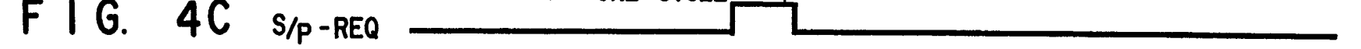
Figures 4D, 4E:
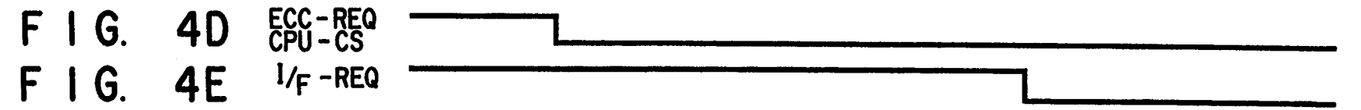
Figure 4F:
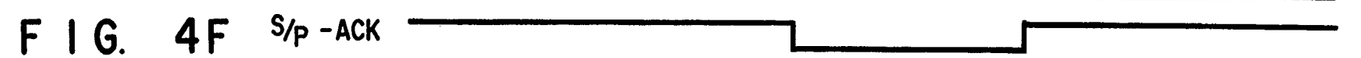
Figure 4G:
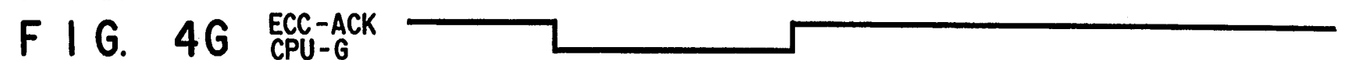
Figure 4H:
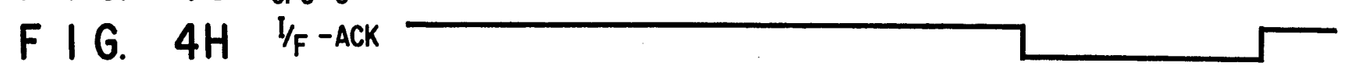

More specifically, when the circuit 17 receives the data-transfer request signal S/P-REQ only which is supplied from the serial-parallel converting circuit 16, it enables this signal S/P-REQ. When the circuit 17 receives the data-transfer request signal ECC-REQ supplied from the error-correcting circuit 15 or the chip-select signal CPU-CS supplied from the CPU 12, it enables the signal ECC-REQ or the signal CPU-CS, provided it does not receive the data-transfer signal S/P-REQ supplied from the serial-parallel converting circuit 16. When the circuit 17 receives the data-transfer request signal I/F-REQ supplied from the interface circuit 13, it enables the signal I/F-REQ, provided it receives no signal supplied from any circuit other than the interface circuit 13.

When the read address data designating that address of the optical disk 10 from which to reproduce data is supplied from the host computer 2 to the CPU 12 via the interface circuit 13 and the system bus 18, the CPU 12 outputs read-mode data to the timing control section 21. At the same time, the CPU 12 outputs a data-reading instruction to the recording-reproducing section 11 via the system bus 18. In response to this instruction, the section 11 reproduces the data from the designated address of the disk 10 and supplies this data to the serial-parallel converting circuit 16.

Upon regenerating every 1-byte data, the serial-parallel converting circuit 16 outputs a data-transfer request signal S/P-REQ to the timing control section 21. The signal S/P has the highest priority as has been indicated. Hence, in response to the signal S/P-REQ the timing control section 21 determines that the data must be transferred from the serial-parallel converting circuit 16 to the data buffer memory 14, and outputs an acknowledge signal S/P-ACK to the serial-parallel converting circuit 16. The moment the cycle clock signal CY-CLK rises to the high level while the cycle-end signal CY-END remains at the "0" level, the timing control section 21 outputs a direction signal S/P-DIR to the circuit 16 and the buffer 25. At the same time, the section 21 outputs an acknowledge signal S/P-ACK to the circuit 16 and the buffer 25, and also a write signal BF-WR and a chip-select signal BF-CS to the data buffer memory 14. The direction signal S/P-DIR supplied from the section 21 to the circuit 16 and the buffer 25 indicates the direction in which to transfer the data, i.e., from the parallel-serial converting circuit 16 to the data buffer memory 14.

As a result, the 1-byte data items the circuit 16 has sequentially generated from the data reproduced by the recording-reproducing section 11 are supplied, at regular intervals, to the data buffer memory 14 through the data bus 34, the buffer 25 and the data bus 35. These 1-byte data items are thereby stored into the data buffer memory 14.

In the meantime, the timing control section 21 outputs a direction signal ECC-DIR to the buffer 24, an acknowledge signal ECC-ACK to the error-correcting circuit 15 and the buffer 24, and a write signal ECC-WR to the error-correcting circuit 15. The direction signal ECC-DIR indicates that data must be transferred from the buffer 25 to the error-correcting circuit 15. Hence, the data generated by the serial-parallel converting circuit 16 and the check codes reproduced from the optical disk 10 are supplied to the error-correcting circuit 15 via the data bus 34, the buffer 25, the data bus 35, the buffer 24, and the data bus 33.

The error-correcting circuit 15 determines whether or not the data reproduced from the disk 10 contains errors. The circuit 15 corrects errors, if any, in the data, and outputs a data-transfer request signal ECC-REQ to the timing control section 21.

Unless the timing control section 21 receives a data-transfer request signal S/P-REQ from the serial-parallel converting circuit 16, the section 21 determines that data must be transferred between the error-correcting circuit 15 to the data buffer memory 14. The moment the cycle clock signal CY-CLK rises to the high level while the cycle-end signal CY-END remains at the "0" level, the section 21 outputs a direction signal ECC-DIR to the buffer, an acknowledge signal ECC-ACK to the error-correcting circuit 15 and the buffer 24, a read signal ECC-RD to the error-correcting circuit 15, and a write signal BF-WR and a chip-select signal BF-CS to the data buffer memory 14.

The data corrected by the error-correcting circuit 15 is thereby supplied to the data buffer memory 14 via the data bus 33, the buffer 24 and the data bus 35. The corrected data is stored into the memory 14, in place of the data hitherto stored therein.

The interface circuit 13 outputs a data-transfer request signal I/F-REQ to the timing control section 21 when it receives a data-transfer enable signal from the host computer 2. As described above, the timing control section 21 determines that data must be transferred between the interface circuit 13 and the data buffer memory 14, provided the section 21 receives no signal supplied from any circuit other than the interface circuit 13. Then, the moment the cycle clock signal CY-CLK rises to the high level while the cycle-end signal CY-END remains at the "0" level, the section 21 outputs a direction signal I/F-DIR to the buffer 23, an acknowledge signal I/F-ACK to the interface circuit 13 and the buffer 13, a write signal I/F-WR to the interface circuit 13, and a read signal BF-RD and a chip-select signal BF-CS to the data buffer memory 14. The direction signal I/F-DIR indicates that data must be transferred from the data buffer memory 14 to the interface circuit 13. The data is thereby supplied from the data buffer memory 14 to the interface circuit 13 through the data bus 35, the buffer 23, and the data bus 32.

Figure 5A:
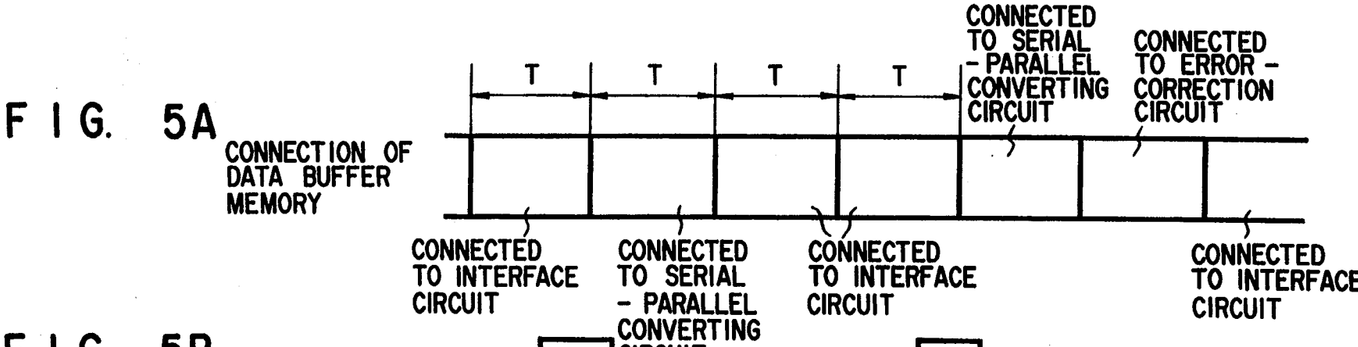
FIGS. 5A, 5B, 5C and 5D are a timing chart, explaining which component is connected to the data buffer memory at which time which the optical disk apparatus is operating.
Figure 5B:
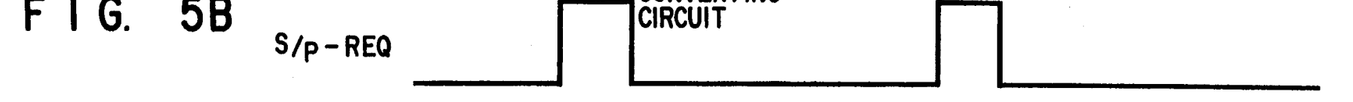
Figure 5C:
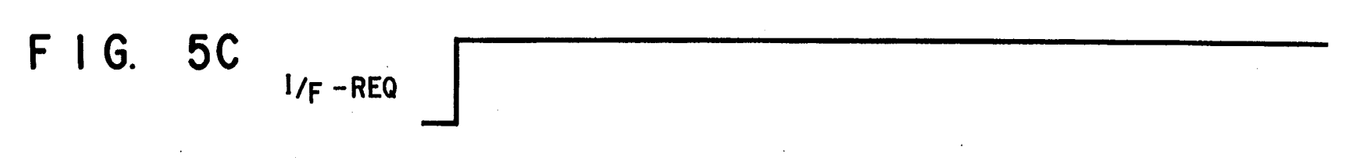
Figure 5D:
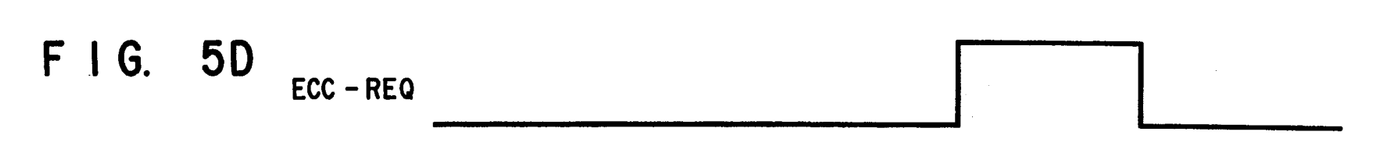

The interface circuit 13 will supply the data to the host computer 2 in accordance with the predetermined interface protocol. To accomplish the data transfer from the circuit 13 to the host computer 2, the data is transferred between the data buffer memory 14 and the serial-parallel converting circuit 16 (or the optical disk 10), between the memory 14 and the error-correcting circuit 15, and between the memory 14 and the interface circuit 13 (or the host computer 2). More precisely, as can be understood from FIGS. 5A, 5B, 5C, and 5D, the data transfer between the memory 14 and the circuit 16 is started when a request signal S/P-REQ is supplied from the circuit 16 to the timing control section 21, the data transfer between the memory 14 and the circuit 15 is started when a request signal ECC-REQ is supplied from the circuit 15 to the section 21 while the request signal S/P-REQ is not being supplied from the circuit 15 to the section 21, and the data transfer between the circuit 13 and the memory 14 is started when a request signal I/F-REQ is supplied from the circuit 13 to the section 21, while neither the request signal S/P-REQ nor the request signal ECC-REQ is being supplied to the timing control section 21. "T" shown in FIG. 5A is the read or write cycle, during which data is read from, and written into, the data buffer memory 14.

In the case the data representing a specific address of the optical disk 10 at which to record data is supplied from the host computer 2 to the CPU 12 through the interface circuit 13 and the system bus 18, the CPU 12 outputs a write-mode instruction to the timing control section 21 and data-record instruction to the recording-/reproducing section 11, instruction that the section 11 records the data at the specific address of the optical disk 10. Meanwhile, the host computer 2 supplies the data, byte by byte, to the interface circuit 13. The circuit 13 stores this data and outputs a data-transfer request signal I/F-REQ to the timing control section 21 in accordance with the interface protocol.

The timing control section 21 determines that the data must be transferred between the interface circuit 13 and the data buffer memory 14. When the cycle clock signal CY-CLK rises to the high level while the cycle-end signal CY-END remains at the "0" level, the section 21 outputs a direction signal I/F-DIR to the buffer 23, an acknowledge signal I/F-ACK to the interface circuit 13 and the buffer 13, a read signal I/F-RD to the interface circuit 13, and a write signal BF-WR and a chip-select signal BF-CS to the data buffer memory 14. The direction signal I/F-DIR indicates that data must be transferred from the interface circuit 13 to the data buffer memory 14. The data is thereby supplied from the interface circuit 13 to the data buffer memory 14 through the data bus 32, the buffer 23, and the data bus 35.

The serial-parallel converting circuit 16 data-transfer request signals S/P-REQ to the timing control section 21—at predetermined intervals of, for example, 3 T.

Upon receipt of every request signal S/P-REQ from the circuit 16, the timing control section 21 determines that the data must be transferred between the data buffer memory 14 and the serial-parallel converting circuit 16. The moment the cycle clock signal CY-CLK rises to the high level while the cycle-end signal CY-END remains at the "0" level, the section 21 outputs a direction signal S/P-DIR to the circuit 16 and the buffer 25. At the same time, the section 21 outputs an acknowledge signal S/P-ACK to the circuit 16 and the buffer 25, and also a read signal BF-RD and a chip-select signal BF-CS to the data buffer memory 14. The direction signal S/P-DIR supplied from the section 21 to the circuit 16 and the buffer 25 indicates that data must be transferred from the memory 14 to the parallel-serial converting circuit 16.

As a result, the data is supplied from the data buffer memory 14 to the serial-parallel converting circuit 16 through the data bus 35, the buffer 25 and the data bus 34. The circuit 16 converts the input parallel data into serial data, which is supplied to the recording-reproducing section 11. The section 11 records the serial data at the address of the disk 10 which the CPU 12 has designated.

Figures 6A, 6B:
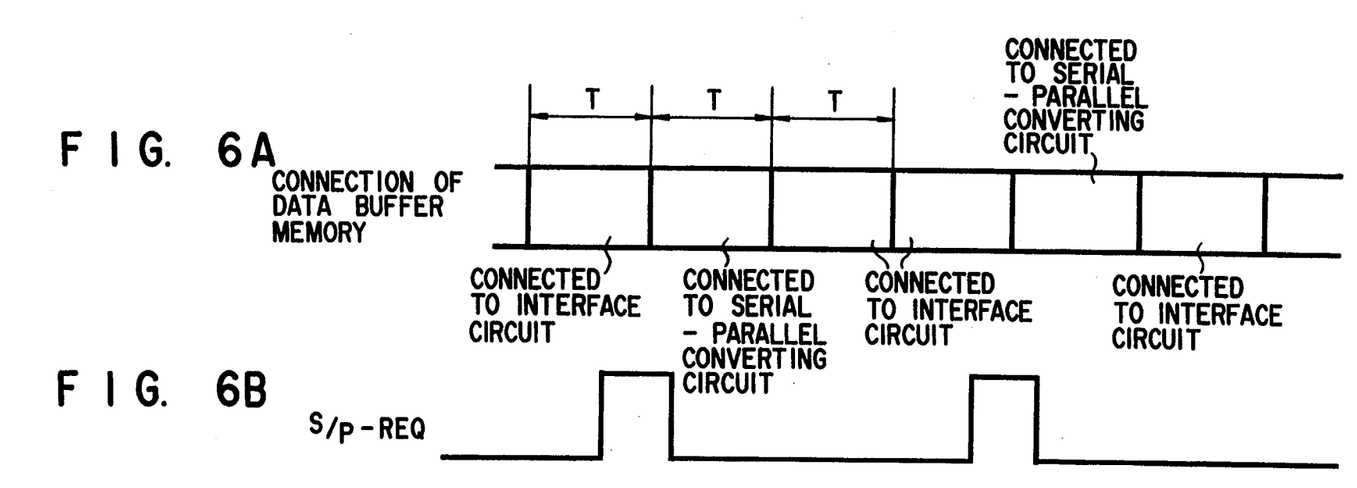
FIGS. 6A, 6B and 6C are a timing chart, explaining which component is connected to the data buffer memory at which time which the optical disk apparatus is operating.
Figure 6C:
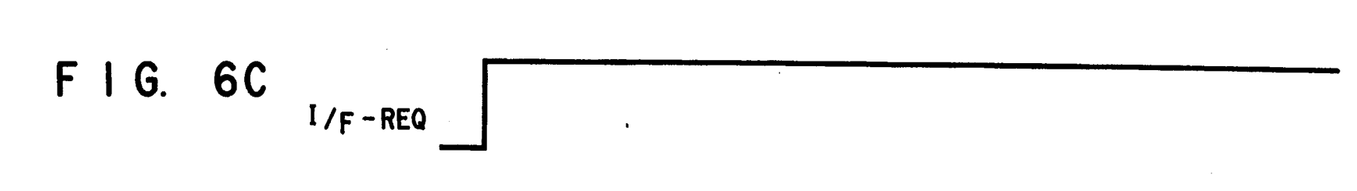

To achieve the data transfer from the data buffer memory 14 to the recording-reproducing section 11, the data is transferred between the interface circuit 13 (or the host computer 2) and the data buffer memory 14 if the request signal I/F-REQ only is supplied from the circuit 13 to the timing control section 21. The data transfer between the memory 14 and the serial-parallel converting circuit 16 is started the moment the data-transfer request signal S/P-REQ is supplied from the serial-parallel converting circuit 16 to the section 21 while the signal I/F-REQ is being supplied to the section 21 from the interface circuit 13.

"T" shown in FIG. 6A is the read or write cycle, during which data is read from, and written into, the data buffer memory 14. The shortest possible duration of the request signal S/P-REQ supplied from the converting circuit 16 is 3 T. Thus, only if the period of 1.5 T is set as the shortest possible duration of the signal I/F-REQ being supplied from the interface circuit 13, the data can be transferred between the interface circuit 13 and the host computer 2, without a time loss.

In the embodiment described above, the error rate of the optical disk 10 is on the order of $10^{-6}$. Therefore, the error-correcting circuit 15 outputs virtually no data-transfer request signal ECC-REQ to the timing control section 21. The possibility that the circuit 15 outputs a signal ECC-REQ is negligibly small.

According to the present invention, the error-correcting circuit 15 can therefore be dispensed with, since the error rate of the optical disk 10 is so los as about $10^{-6}$.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An apparatus for reproducing data from a data-recording medium and outputting the reproduced data to an external apparatus, comprising:

data-reproducing means for reproducing the data from the data-recording medium;

a buffer memory for storing the reproduced data;

interface mean for outputting the reproduced data to the external apparatus;

first data-transferring means for transferring, in predetermined units, the reproduced data from the data-reproducing means to the buffer memory, and for outputting a first transfer-request signal prior to transferring each of the predetermined units of the reproduced data;

second data-transferring means for transferring each of the predetermined units of the reproduced data from the buffer memory to the interface means, and for outputting a second transfer-request signal prior to transferring each of the predetermined units of the reproduced data;

control means for determining whether the first and second data-transferring means has outputted the first and second transfer-request signals, respectively, for causing, when the control means determines that the first data-transferring means has outputted the first transfer-request signal, the first data-transferring means to transfer a selected one of the predetermined units of the reproduced data from the data-reproducing means to the buffer memory before causing the second data-transferring means to transfer a designated one of the predetermined units of the reproduced data from the buffer memory to the interface means, and for causing, when the control means determines that the second data-transferring means has outputted the second transfer-request signal and that the first data-transferring means has not outputted the first transfer-request signal, the second data-transferring means to transfer the designated one of the predetermined units of the reproduced data from the buffer memory to the interface means.

2. An apparatus for reproducing data from a data-recording medium and outputting the reproduced data to an external apparatus, comprising:

data-reproducing means for reproducing the data from the data-recording medium;

a buffer memory for storing the reproduced data;

interface mean for outputting the reproduced data to the external apparatus;

first data-transferring means for transferring, in predetermined units, the reproduced data from the data-reproducing means to the buffer memory, and for outputting a first transfer-request signal prior to transferring each of the predetermined units of the reproduced data;

second data-transferring means for transferring each of the predetermined units of the reproduced data from the buffer memory to the interface means, and for outputting a second transfer-request signal prior to transferring each of the predetermined units of the reproduced data;

error-detecting means for detecting errors in the reproduced data before the data is transferred to the buffer memory;

data-generating means for generating, when the error-detecting means detects an error in the reproduced data, error-free data from the reproduced data;

third data-transferring means for transferring, in predetermined units, the error-free data from the data-generating means to the buffer memory, and for outputting a third transfer-request signal prior to transferring each of the predetermined units of the error-free data;

control means for determining whether the first, second and third data-transferring means has outputted the first, second and third transfer-request signals, respectively, for causing, when the control means determines that the first data-transferring means has outputted the first transfer-request signal, the first data-transferring means to transfer a selected one of the predetermined units of the reproduced data from the data-reproducing means to the buffer memory before causing the second data-transferring means to transfer a designated one of the predetermined units of the reproduced data from the buffer memory to the interface means and before causing the third data-transferring means to transfer a selected one of the predetermined units of the error-free data from the data-generating means to the buffer memory, for causing, when the control means determines that the third data-transferring means has outputted the third transfer-request signal and that the first data-transferring means has not outputted the first transfer-request signal, the third data-transferring means to transfer the selected one of the predetermined units of the error-free data from the data-generating means to the buffer memory, and for causing, when the control means determines that the second data-transferring means has outputted the second transfer-request signal and that the first data-transferring means has not outputted the first transfer-request signal, the second data-transferring means to transfer the designated one of the predetermined units of the reproduced data from the buffer memory to the interface means.

3. An apparatus for receiving data from an external apparatus and recording the received data on a data-recording medium, comprising:

data-receiving means for receiving the data from the external apparatus;

a buffer memory for storing the received data;

data-recording means for recording the received data on the data-recording medium;

first data-transferring means for transferring, in predetermined units, the received data from the buffer memory to the data-recording medium, and for outputting a first transfer-request signal prior to transferring each of the predetermined units of the received data;

second data-transferring means for transferring each of the predetermined units of the received data from the data-receiving means to the buffer memory, and for outputting a second transfer-request signal prior to transferring each of the predetermined units of the received data;

control means for determining whether the first and second data-transferring means has outputted the first and second transfer-request signals, respectively, for causing, when the control means determines that the first data-transferring means has outputted the first transfer-request signal, the first data-transferring means to transfer a selected one of the predetermined units of the received data from the buffer memory to the data-recording means before causing the second data-transferring means to transfer a designated one of the predetermined units of the received data from the data-receiving means to the buffer memory, and for causing, when the control means determines that the second data-transferring means has outputted the second transfer-request signal and that the first data-transferring means has not outputted the first transfer-request signal, the second data-transferring means to transfer the designated one of the predetermined units of the received data from the data-receiving means to the buffer memory.

* * * * *